United States Patent [19]
Rosenbluth

[11] Patent Number: 5,850,085
[45] Date of Patent: Dec. 15, 1998

[54] TEST FIXTURE FOR DIGITAL MEASUREMENT OF VEHICLE AIR BAG DEPLOYMENT CHARACTERISTICS

[76] Inventor: William Rosenbluth, 12015 Canter La., Reston, Va. 20191

[21] Appl. No.: 848,010

[22] Filed: Apr. 28, 1997

[51] Int. Cl.$^6$ .................................................. B60R 21/16
[52] U.S. Cl. ............................. 250/559.21; 250/559.22; 250/208.1; 73/865.6; 280/739; 356/376
[58] Field of Search ........................... 250/559.21, 208.1, 250/208.2, 559.22; 73/865.6, 37; 280/734, 739, 743.1, 743.2; 356/376

[56] References Cited

U.S. PATENT DOCUMENTS

| | | | |
|---|---|---|---|
| 5,355,740 | 10/1994 | Beaudet et al. | 73/865.6 |
| 5,394,326 | 2/1995 | Liu | 701/46 |
| 5,490,069 | 2/1996 | Gioutsos et al. | 701/45 |
| 5,639,118 | 6/1997 | Rhule et al. | 280/743.1 |

OTHER PUBLICATIONS

"Capture Images of Fast–Moving Parts", by Steve Haywood, *Test & Measurement World*, Feb. 15, 1997, pp. 39–40.
"Air Bag Deployment Characteristics", by L.K. Sullivan and J.M. Kosser, NHTSA, Vehicle Research and Test Center, DOT HS 807 869, dated Feb. 1992.
"Leading Edge Deployment Speed of Production Air Bags", by M. Powell and A.K. Lund, publish by Insurance Institute for Highway Safety in Jan. 1995.

*Primary Examiner*—Stephone B. Allen
*Attorney, Agent, or Firm*—Blank Rome Comisky & McCauley LLP

[57] ABSTRACT

The disclosed invention is a method of and a system for taking digital measurements of vehicle air bag deployment characteristics versus time in which the key parameter measured is air bag envelope throw, outboard from the storage canister from which envelope leading edge velocity is derived. Also measured are squib voltage, squib current, and exhaust gas temperature. Envelope throw is recorded on three axes, the central, left diagonal and right diagonal, which are instrumented on a checkerboard target containing photo-transistors at the checkerboard intersections. The photo-transistors are connected to a stepped voltage ladder, and conduct when they are illuminated, causing their respective output voltages to be low. When illumination is interrupted, the photo-transistors turn off, and allow the output of a voltage which is proportional to position on the checkerboard. Before the air bag is fired, all photo-transistors are illuminated, keeping all outputs low. When the air bag is fired, the expanding envelope interrupts illumination to respective photo transistors and they turn off and cause a stepped voltage output, proportional to their position on the checkerboard, but the still-illuminated photo-transistors stay on and keep their outputs low. The expanding envelope leading edge position is therefore known each time the positional voltage outputs are sampled. The electrical, thermal and distance-proportional signals are simultaneously monitored using a data acquisition system at rates up to 5000 sample words per second.

20 Claims, 8 Drawing Sheets

TEST FIXTURE FOR DIGITAL MEASUREMENT OF VEHICLE AIR BAG DEPLOYMENT CHARACTERISTICS

BACKGROUND OF THE INVENTION

This invention relates generally to vehicle air bag test devices and, more particularly, to equipment designed to measure air bag envelope deployment to ascertain whether its performance is within design specifications and safety guidelines.

Heretofore, known devices used to measure air bag deployment throw and velocity have been constructed by using photographic or videographic imaging equipment to record the deployment event. After photographic or videographic recordation, the captured images are then graphically digitized and processed in order to derive useful information such as envelope deployment throw and leading edge velocity.

The above-described procedures were employed to derive source data, for example, in U.S. Pat. No. 5,355,740 to Beaudet, et al., issued Oct. 18, 1994, in which there is described a test fixture for mechanically firing an air bag envelope with compressed gas and a special valve. Beaudet, et al. do not, however, disclose any information concerning measurement of squib electrical parameters, of air bag envelope position or of air bag velocity data.

Another prior device which utilizes the above-described procedures is described in "Capture Images Of Fast-Moving Parts", by Steve Haywood, which appeared in *Test & Measurement World*, Feb. 15, 1997, at pages 39–40. This article documents an electric imaging method for recording movement of an object wherein the valuable data is the dynamic performance of the object under study. The resolution described is 1,000 frames per second and requires subsequent image processing to derive quantitative object position and velocity data.

In yet another publication, entitled "Air Bag Deployment Characteristics", by L. K. Sullivan and J. M. Kosser, NHTSA, Vehicle Research and Test Center, DOT HS 807 869, dated February 1992, there is disclosed a photographic method for recording the position of an air bag envelope after firing. The disclosed resolution is 5,000 frames per second, which is recorded on photographic film and requires subsequent image processing in order to derive quantitative object position and velocity data. This article does not include any information about the measurement of squib electrical parameters.

In yet another article, entitled "Leading Edge Deployment Speed of Production Air Bags", by M. Powell and A. K. Lund, published by the Insurance Institute for Highway Safety in January 1995, a photographic method for recording position of an air bag envelope after firing is disclosed. The maximum resolution is defined by a 1,000 Hz synchronizer light. Subsequent image processing, by means of comparing the object to the synchronizer light, is required in order to derive quantitative object position and velocity data. This article does not disclose any information concerning the measurement of squib electrical parameters.

Contrary to the above-described prior art test devices and methods, the present invention utilizes readily available components to digitally record the events heretofore captured by using photographic or videographic imaging equipment. Specifically used are a personal computer, a Keithley-Metrabyte DAS-1802HC acquisition card, SnapMaster data software and a checkerboard target containing an array of photo-transistors positioned at the checkerboard intersections.

SUMMARY AND OBJECTS OF THE INVENTION

In view of the foregoing, it should be apparent that there still exists a need in the art for a method of and apparatus for providing an improved air bag test device which easily and accurately measures air bag envelope deployment throw and leading edge velocity on a real time basis. It is, therefore, a general object of the present invention to provide an improved air bag test device for measurement of air bag envelope deployment throw and leading edge velocity in a live deployment test.

It is another object of the present invention to provide a variable controlled igniter voltage/current-time impulse to trigger the firing event, and to also record the actual igniter voltage and current during the deployment with high precision.

It is a further object of the present invention to provide an immediate chart representation of the data recorded for the deploy event, so that the operator can verify that the deploy test recordation was successful.

It is yet another object of the present invention to provide an established path to derive useful chart information from the recorded deployment data.

Briefly described, these and other objects of the present invention are accomplished by constructing a test fixture and system for taking digital measurements of vehicle air bag deployment characteristics versus time. The key parameter measured is air bag envelope leading edge throw distance, outboard from the storage canister, versus time. Envelope leading edge velocity is then derived from this data. Also measured are squib voltage, squib current, and exhaust gas temperature.

Envelope throw is recorded on three axes, the central, left diagonal and right diagonal, which are instrumented on a checkerboard target containing photo-transistors at the checkerboard intersections. The checkerboard consists of one inch alternating white/black squares. The photo-transistors are mounted at intersections of the checkerboard squares corresponding to the axes of expected air bag envelope throw. The photo-transistors serve to ground a ratioed voltage divider when they are illuminated. The voltage divider for each location is ratioed so that succeeding throw distances produce a step-increased voltage when they release or unground the divider circuit as they become non-conductive without illumination.

In the use of the inventive device, the photo-transistor illumination is interrupted when the deploying air bag interrupts the illumination beam to the photo-transistor(s). Since each position has a unique voltage output, the air bag leading edge position is known versus time. The photo-transistor ladder voltages are repeated every decade. Each position of the axes of interest is monitored using a separate data acquisition channel.

In operation, before the air bag under test is fired, all photo cells are illuminated, keeping all outputs low. When the air bag is fired, the expanding envelope interrupts illumination to all positions before its leading edge and causes the photo-transistors to turn off. That causes the voltage output, which is proportional to the photo-transistor position on the checkerboard, to be detected by the data acquisition system. However, the still-illuminated photo-transistors stay on and their outputs are kept low, which data is also detected by the data acquisition system. Thus, the envelope leading deployment throw is known each time the positional voltage outputs are sampled.

The electrical, thermal and distance-proportional signals are each monitored on separate channels of a data word by a data acquisition system at rates up to 5000 sample words per second. This system provides an instant oscillograph view of selected channels on its computer screen, and then saves the entire ensemble of test data to hard disk. The positional indication, which has been recorded to hard disk, is then used to derive air bag envelope throw and velocity.

The firing of the squib for the air bag under test is accomplished with a deploy controller. The deploy controller consists of a circuit which allows a variable firing pulse width and variable firing voltage to be applied to the squib, monitors the SQUIB+volts, SQUIB−volts and I_SQUIB parameters, and couples the parameter signals to the data acquisition system. Additionally, the deploy controller initiates the data acquisition system before the deploy event.

DETAILED DESCRIPTION OF THE PREFERRED EMBODIMENT

Figure 1:
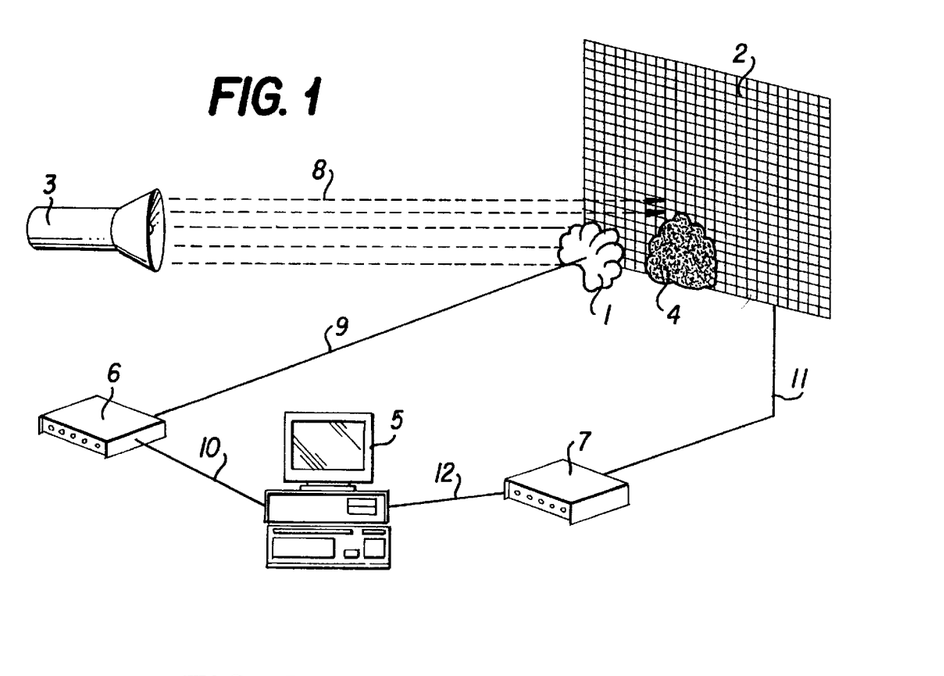
FIG. 1 is a schematic block diagram of the inventive test system for digital measurement of vehicle air bag deployment characteristics.

Referring now to the Figures in greater detail, in which like reference numerals refer to like components throughout, there is shown in FIG. 1 an overall schematic diagram of the inventive test fixture system for digital measurement of vehicle air bag deployment characteristics. The test fixture consists of an air bag under test 1, which is placed in front of a checkerboard target 2. The target 2 and the air bag under test 1 are illuminated by a light beam from the illuminator 3 which is positioned relatively far back from the target so as to minimize any meaningful parallax error. The checkerboard target 2 is instrumented with photo-transistors at key intersections so that when an air bag 1 under test is not deployed, the photo-transistors are illuminated, thereby conducting, and holding their respective outputs low.

The photo-transistor outputs are individually voltage-scaled, with respect to their axis position, and those outputs are coupled via a photo detector umbilical cable 11 to a data interface 7, which is in turn connected via lines 12 to the data acquisition computer 5. The air bag under test 1 is connected to the Deploy Controller 6 which is in turn connected via the lines 10 to the data acquisition computer 5.

Figures 2, 3:
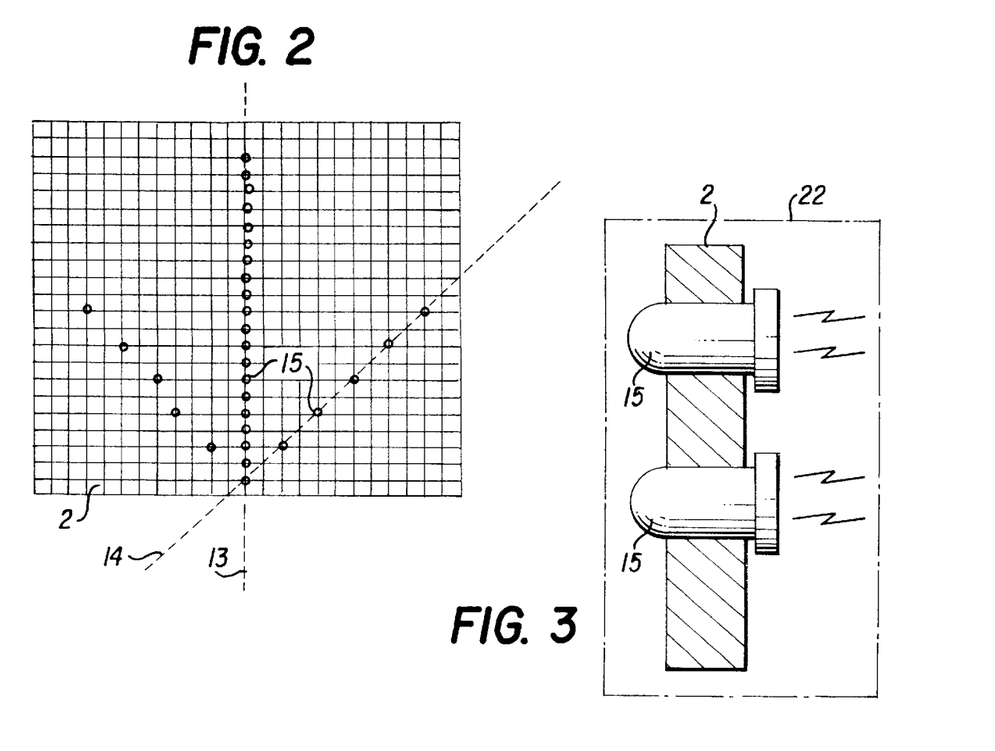
FIG. 2 is a detailed schematic diagram of a typical photo-transistor layout on a checkerboard target.
FIG. 3 is a drawing of a typical section of the target checkerboard showing the mechanical cross section of photo-transistors mounted through the material of the target backboard.

FIG. 2 shows a schematic drawing of a typical layout of the checkerboard target 2, showing the photo-transistors 15 at the intersections of the axes and the checkerboard squares. The central axis 13 and the right diagonal axis 14, are identified. Such checkerboard targets 2 are known in the art.

In FIG. 3 there is shown a cross sectional view of a typical section of the checkerboard target 22, showing the photo-transistors 15 mounted through the material of the target backboard 2, so that the lens of each photo-transistor 15 projects forward of the surface of the checkerboard target in order to receive illumination, as appropriate.

Figures 4, 5:
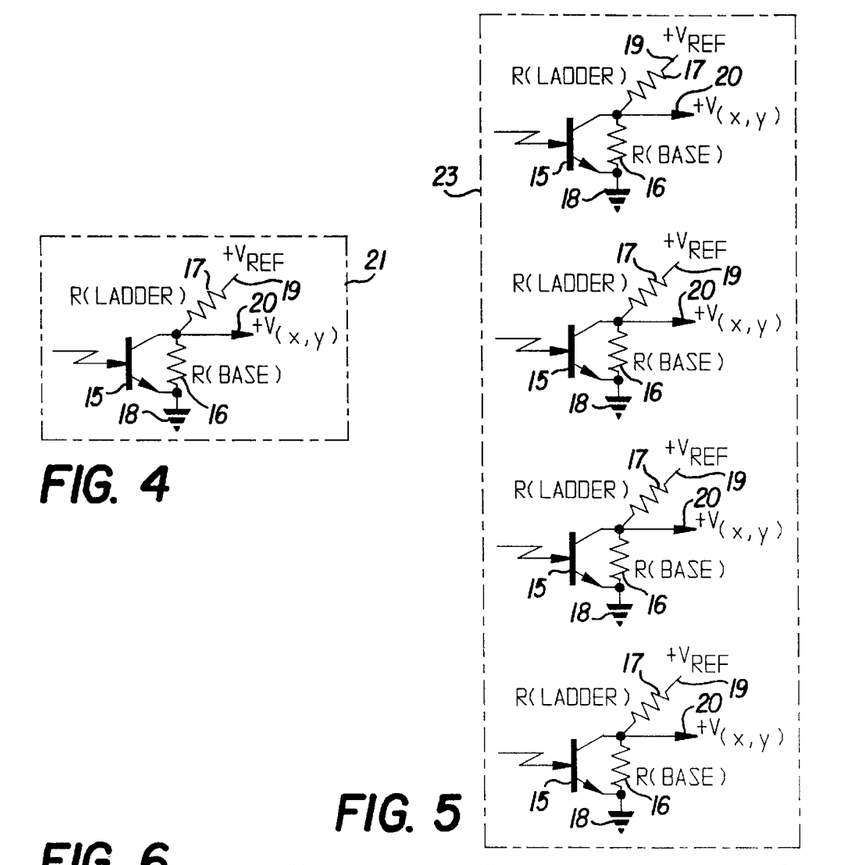
FIG. 4 is an electrical schematic drawing of one photo-transistor circuit in the checkerboard array of photo-transistors shown in FIG. 2.
FIG. 5 is an electrical schematic drawing of a multiple section of the photo-transistor array shown in FIG. 2 on each of the three axes.

FIG. 4 shows a schematic circuit diagram representative of the circuit detail of one photo-transistor circuit 21 that is associated with each photo-transistor element in the checkerboard target cross section 22. The emitter of the photo-transistor 15 is connected to ground 18. A base resistor 16 is connected between the base and ground 18. The proportioning resistor 17 is connected between the reference voltage input 19 and the base of the photo-transistor 15. The cell output is at element 20.

FIG. 5 shows a representative section of the photo-transistor ladder on each of the three axes of the checkerboard target cross section 22. Each of the individual cell sections 21 has a ladder resistor R(ladder) which is adjusted so that progressive blocked illumination of the photo-transistors 15 produces a stepped increased voltage output on its respective monitor channel at the data acquisition computer 5.

Figure 6:
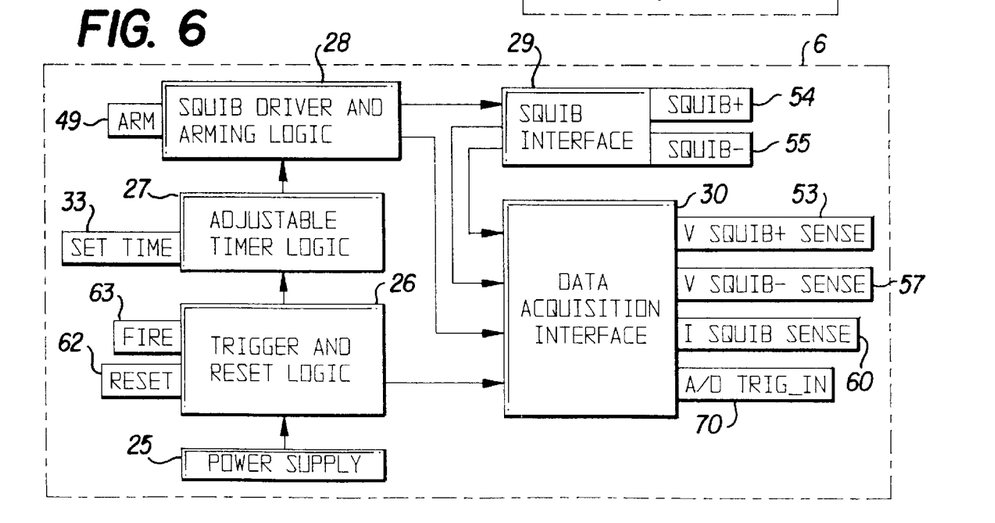
FIG. 6 is a schematic block diagram of the deploy controller used with the present invention.

FIG. 6 is a block schematic diagram of the Deploy Controller 6, consisting of six functional blocks: the Power Supply 25; the Trigger & Reset Logic 26; the Adjustable Timer Logic 27; the Squib Driver & Arming Logic 28; the Squib Interface 29; and the Data Acquisition Interface 30. The Power Supply 25 serves to supply the +12, +8 and +5 volts to the other five components 26–30 of the Deploy Controller 6.

The Trigger & Reset Logic 26 serves to provide several internal and external functions associated with its RESET 62 and FIRE SQUIB 63 push button switches. It consists of two latches which are reset together, but which are set in a special sequence to produce a complete data acquisition record of the squib firing event.

The Adjustable Timer Logic 27 provides a variable length signal to the power driver in the Squib Driver & Arming Logic 28 which then creates the electrical signal to fire the air bag squib.

Figure 7:
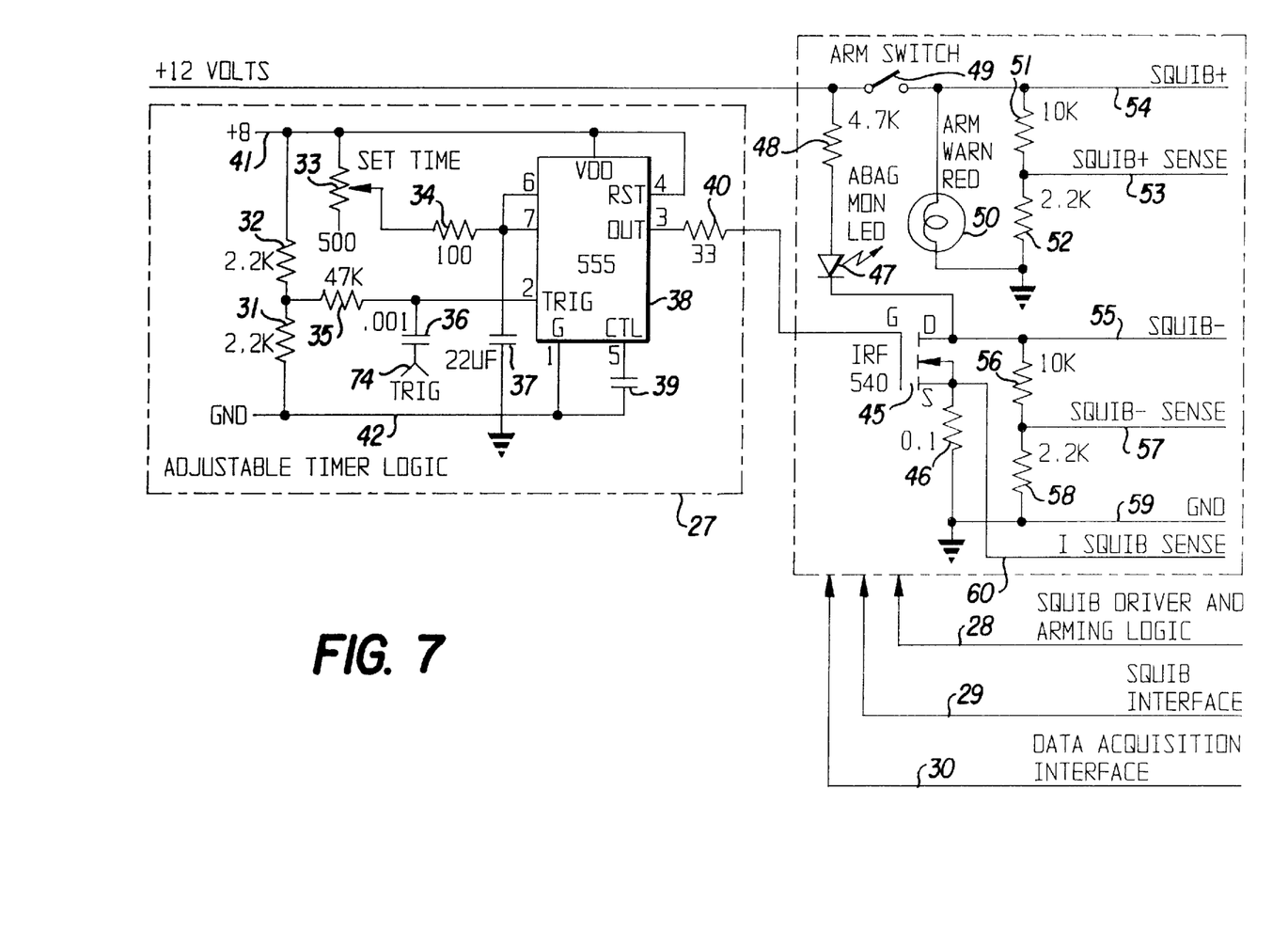
FIG. 7 is an electrical circuit schematic diagram of four of the six blocks of the deploy controller of FIG. 6.

The Squib Driver & Arming Logic 28, the Squib Interface 29, and the Data Acquisition Interface 30, shown as a group in FIG. 7, perform several functions:

a. The ARM SWITCH 49, which forms part of the Squib Driver and Arming Logic 28, provides a redundant manual operation before there can be any squib fire. When the ARM SWITCH 49 is actuated, it causes the ARM WARN incandescent indicator 50 to be illuminated, and thus acts as a failsafe indicator to the operator before actual air bag deployment.

b. The AIR BAG MON LED 47 acts as an indicator, before the ARM SWITCH 49 is actuated, to indicate that the air bag under test is actually connected in the test circuit. It does this by allowing approximately 2–3 milliamps to flow through the squib, back through the ARM WARN incandescent indicator 50, and thus illuminate the LED 47. Once the ARM SWITCH 49 is actuated or closed, the AIR BAG MON LED 47 goes out, and the ARM WARN incandescent indicator 50 is illuminated. The illuminated ARM WARN indicator 50, together with the illuminated TRIG ARMED LED 73, alert the operator that the system is ready to fire the air bag under test.

c. The SQUIB+54 and SQUIB−55 voltages of the Squib Interface 29 are sensed by ratioed linear dividers to produce the V SQUIB+sense 53 and V SQUIB−sense 57 output voltages for input to the data acquisition computer 5. That is done to keep the signals within the range of the model DAS 1802 HC data acquisition A/D detectors. Similarly, the I Squib signal is sensed by reading the voltage across the 0.1 ohm sensing resistor 46 to develop the I SQUIB sense signal 60 which is provided to the data acquisition computer 5. Both the voltage and the current inputs are independently calibrated to proper engineering units before each test series is conducted using the apparatus of the present invention.

FIG. 7 shows an electrical schematic circuit of four of the six blocks of the Deploy Controller 6, consisting of the circuits that implement the Adjustable Timer Logic 27, the Squib Driver & Arming Logic 28, the Squib Interface 29, and the Data Acquisition Interface 30.

The Adjustable Timer Logic 27 provides a variable length signal to the power driver component 45, which may be a model IRF540 power driver, in the Squib Driver & Arming Logic 28. The IRF 540 power driver 45 actually creates a voltage difference across the squib terminals, SQUIB+54, and SQUIB−55, thereby creating the squib firing current. The firing voltage is determined by the actual value from the +12 volt power supply, which can be varied. The firing duration is controlled by the time constant created by the adjustment of the SET TIME potentiometer 33 and the 22 $\mu$f capacitor 37 connected respectively to terminals 6, 7 of the model 555 timer IC device 38. The Adjustable Timer Logic 27 squib fire sequence is initiated by a negative edge signal on the TRIG-TO-TIMER 74 line into the capacitor 36, which capacitor 36 is connected to the TRIG terminal of the 555 timer IC 38.

Figure 8:
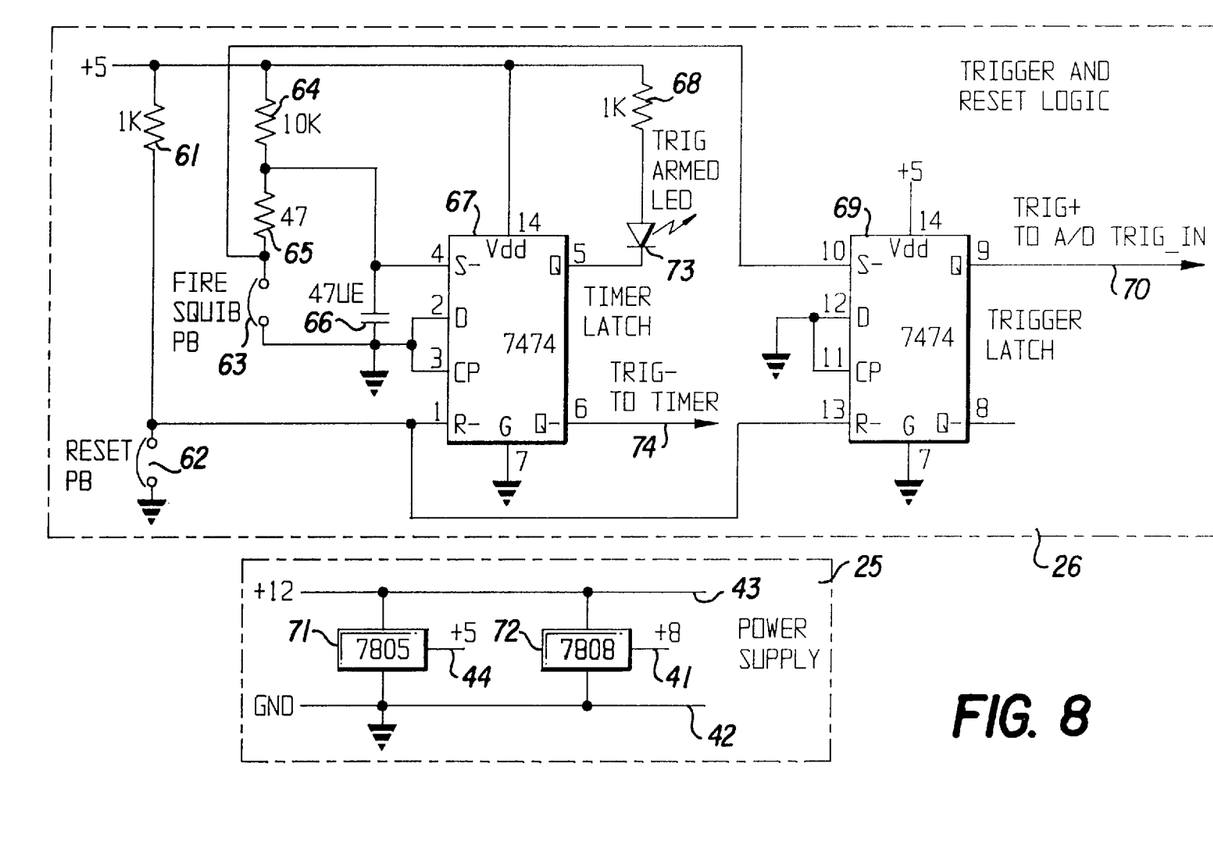
FIG. 8 is an electrical circuit schematic diagram of the remaining two blocks of the deploy controller of FIG. 6 not shown in FIG. 7.

FIG. 8 is a schematic circuit diagram of the remaining two of the six blocks of the Deploy Controller 6, consisting of the circuits that implement the Power Supply 25 and the Trigger & Reset Logic 26.

The Power Supply 25 serves to supply +12, +8 and +5 volts to the other five components 26–30 of the Deploy Controller 6. The +12 volt supply 43 can be varied if desired to produce different initial firing voltage potentials across the squib under test. The +5 supply 44 is derived from a model 7805 IC voltage regulator 71. The +8 volt supply 41 is derived from a model 7808 IC voltage regulator 72.

The Trigger & Reset Logic 26 serves to provide several internal and external functions associated with its RESET 62 and FIRE SQUIB 63 push button switches. It consists of two model 7474 IC latches which are reset together, but which are set in a special timing sequence to produce an early synchronization signal to allow the data acquisition record to start before the squib firing event. That sequence follows.

a. On activating the RESET push button 62, the 7474 timer latch 67 and the 7474 trigger latch 69 are reset. The TRIG-TO-TIMER line 74 goes positive (logic 1), the TRIG+TO A/D TRIG_IN line 70, goes negative (logic 0), and the TRIG ARMED LED 73 is energized. This state is the only state from which the squib can be fired by the Deploy Controller 6.

b. On activating the FIRE SQUIB push button 63, the TRIG+TO A/D TRIG_IN line 70 immediately goes positive (logic 1).

c. On activating the FIRE SQUIB push button 63, but after a delay controlled by the time constant created by the 47 $\mu$f capacitor, 66, and the 47 ohm resistor, 65, the timer latch, 67, is switched causing the TRIG-TO TIMER line, 74, to go negative (logic 0). This negative going edge on the TRIG-TO TIMER line, 74, initiates the adjustable timer logic, 27, which causes squib firing pulse to be applied the across the squib terminals, SQUIB+54, and SQUIB−55, thereby creating the squib firing current in the air bag under test, 1. This time sequencing allows the A/D card, and the data acquisition computer 5 to start recording before the Adjustable Timer 27 is triggered to start the squib firing sequence, and thus capture all deployment data.

OPERATION OF THE INVENTION

In operation, the inventive system is used by first calibrating the Deploy Controller 6 and the data acquisition computer 5, with a known resistive dummy load connected between the SQUIB+54 and SQUIB−55 terminals of the Squib Driver and Arming Logic 28, thereby calibrating the current detect shunt 46, and adjusting the Set Time rheostat 33 to produce the desired deploy pulse width. Calibration is usually accomplished in 2–3 such calibration trials. After the shunt and pulse width calibration, the entire fixture is operated with the illuminator 3 off, and then on, to verify that each photo-transistor element and the array of such elements of the target 2, responds correctly to full illumination and full dark conditions. Check plots are made to document this operation. After calibration, the inventive device is ready for the air-bag-under-test operation. The operation of the inventive fixture is identical for calibration and for actual air-bag-under-test operations.

The fixture is operated by first assuring that the Arm Switch 49 is off, and then connecting the air-bag-under-test, or dummy load, between the SQUIB+54 and SQUIB−55 terminals of the Squib Driver and Arming Logic 28. Next, the Trigger and Reset Logic 26 is reset by actuating the Reset push button 62. Then, the operator checks the Air Bag Monitor LED 47 for illumination to assure that the air-bag-under-test, or dummy-load, has been properly connected to the SQUIB+54 and SQUIB−55 terminals of the Squib Driver and Arming Logic 28.

Next, the operator initiates the ready-for-trigger-state on the data acquisition computer 5. Then, the operator actuates the ARM SWITCH 49, and should observe the ARM WARN Light 50 illuminate and the Air Bag Monitor LED 47 go out. This indicates proper air-bag-under-test, or dummy-load readiness for firing. The illuminator 3 is then turned on.

The inventive system is now ready for an air-bag-under-test, or dummy-load operation. The last operation to initiate the air-bag-under-test or dummy-load firing is to actuate the FIRE SQUIB push button 63. That causes the pre-calibrated timed deploy pulse to be generated by the IRF 540 power driver 45, and to be applied to the air-bag-under-test or dummy-load connected to the SQUIB+54 and SQUIB−55 terminals of the Squib Driver and Arming Logic 28.

Starting before application of the deploy pulse, the data acquisition computer 5 records the voltages, current, and target photo-transistor outputs at the rate up to 5000 sample words per second. The time-stamped output array of those data words is used for subsequent display and calculation of voltages, current, leading edge throw and leading edge velocity. The squib voltages, squib current and the first three decades of the checkerboard detector outputs are immediately shown on the data acquisition computer screen. The Data Acquisition Computer 5 may be a personal computer using a Keithly-Metrabyte model DAS-1802HC data acquisition card, available from Keithly-Metrabyte of Taunton, Mass. 02780, and operating with SnapMaster Data software, available from HEM Data Corporation of Southfield, Mich. 48076. An example of these outputs is shown in FIGS. 9, 10, 11 and 12.

Figure 9:
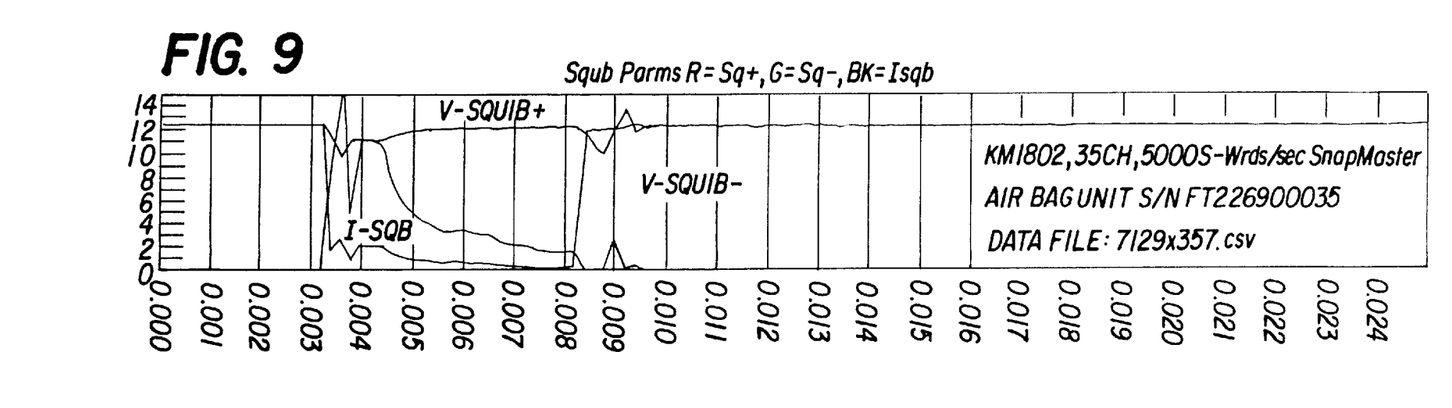
FIG. 9 is a drawing of a sample screen capture of the system output immediately following a live deployment showing SQUIB+volts, SQUIB−volts and I_SQUIB plotted versus time.

FIG. 9 shows V-SQUIB+V-SQUIB− and I-SQUIB outputs versus time.

Figure 10:
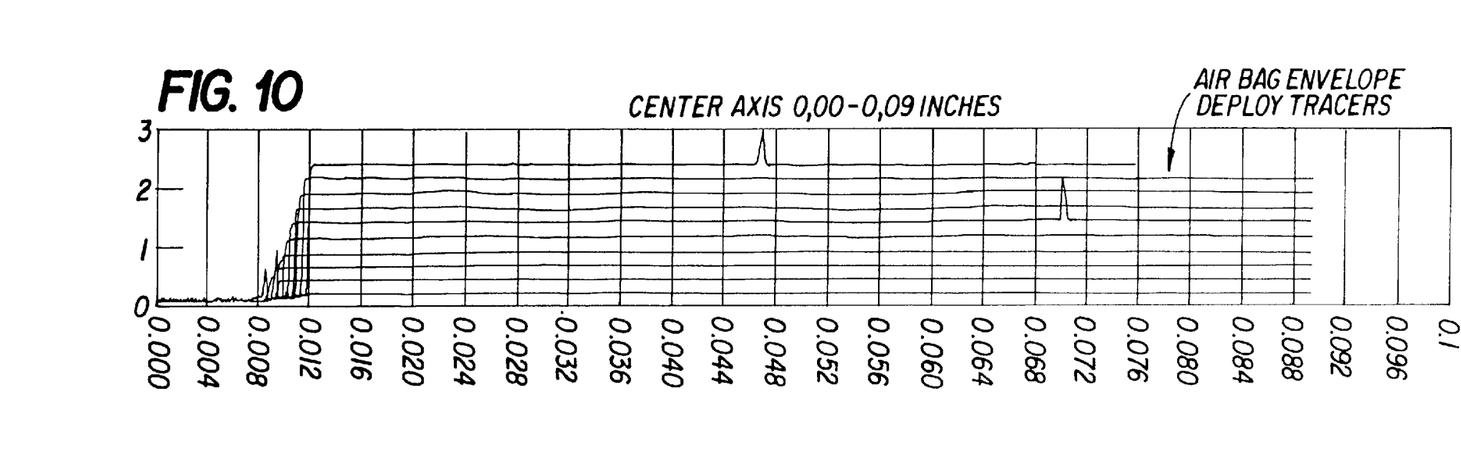
FIGS. 10 & 11 are drawings of screen captures of the system output immediately following a live deployment showing Central Axis output response steps for C 0,00 through C 0,19 inches plotted versus time in which each checkerboard intersection crossed is discernable by a unique voltage level on the oscillograph.
Figure 11:
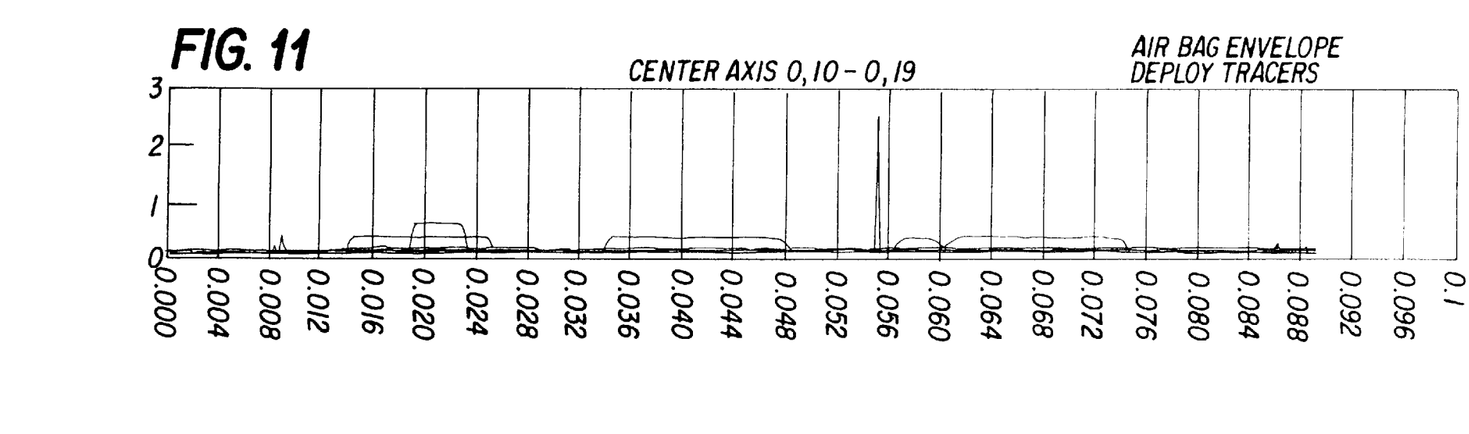

FIGS. 10 and 11 show the voltage coding of the throw-distance-specific photo-transistors on the central axis 13 of the checkerboard target 2. In these Figures, the progressing leading edge of the air bag envelope can be seen as voltage steps versus time. FIG. 10 represents the central axis positions 0 through 9. FIG. 11 represents the central axis positions 10 through 19.

Figure 12:
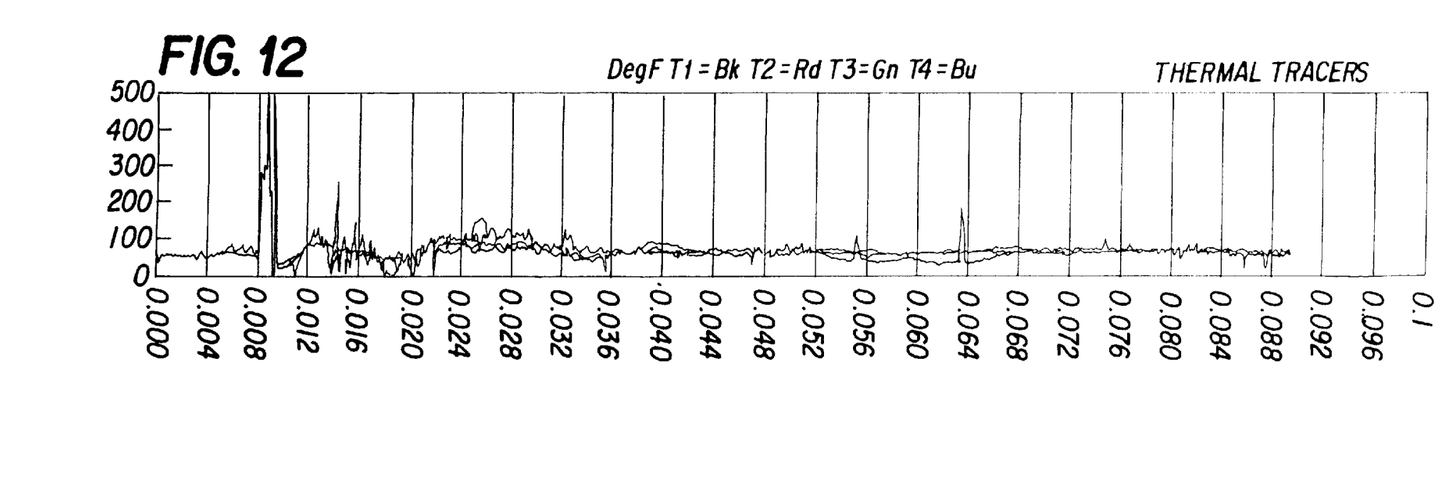
FIG. 12 is a drawing of a screen capture of the system output immediately following a live deployment showing exhaust gas temperatures T1, T2, T3, T4. versus time.

FIG. 12 shows the temperature response versus time, with only a very slight temperature rise being recorded at the 22–30 ms period.

Figure 13:
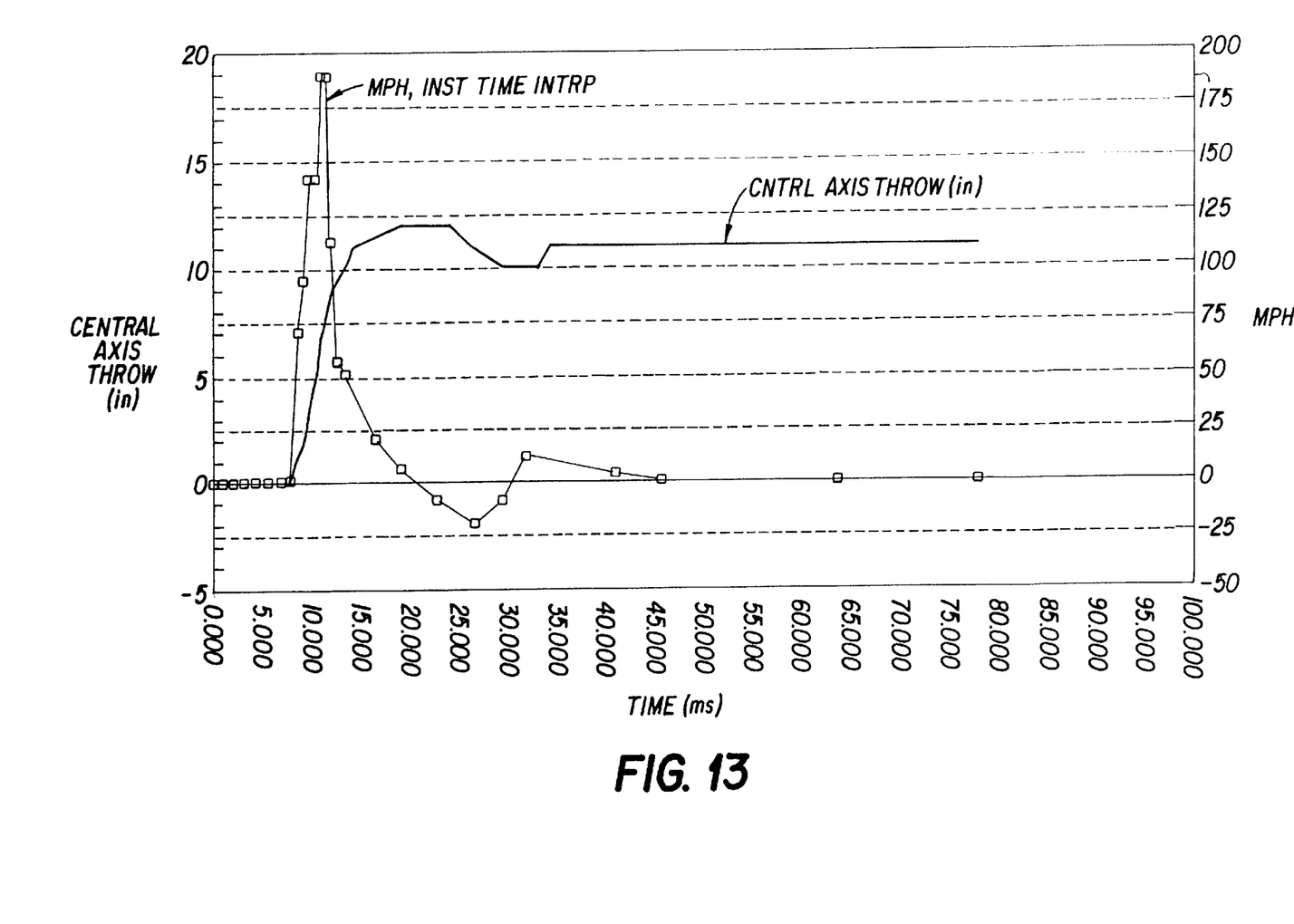
FIG. 13 is a drawing of the post processed system output data in which two labeled data plots show Envelope Deploy throw (in) vs Time (ms) and Envelope Velocity (MPH) vs Time (ms), respectively.

The throw and velocity data are interpreted into a time response line chart as shown in FIG. 13. FIG. 13 shows the instantaneous throw position and instantaneous velocity versus time after firing, which is derived from the full deployment data.

Figure 14:
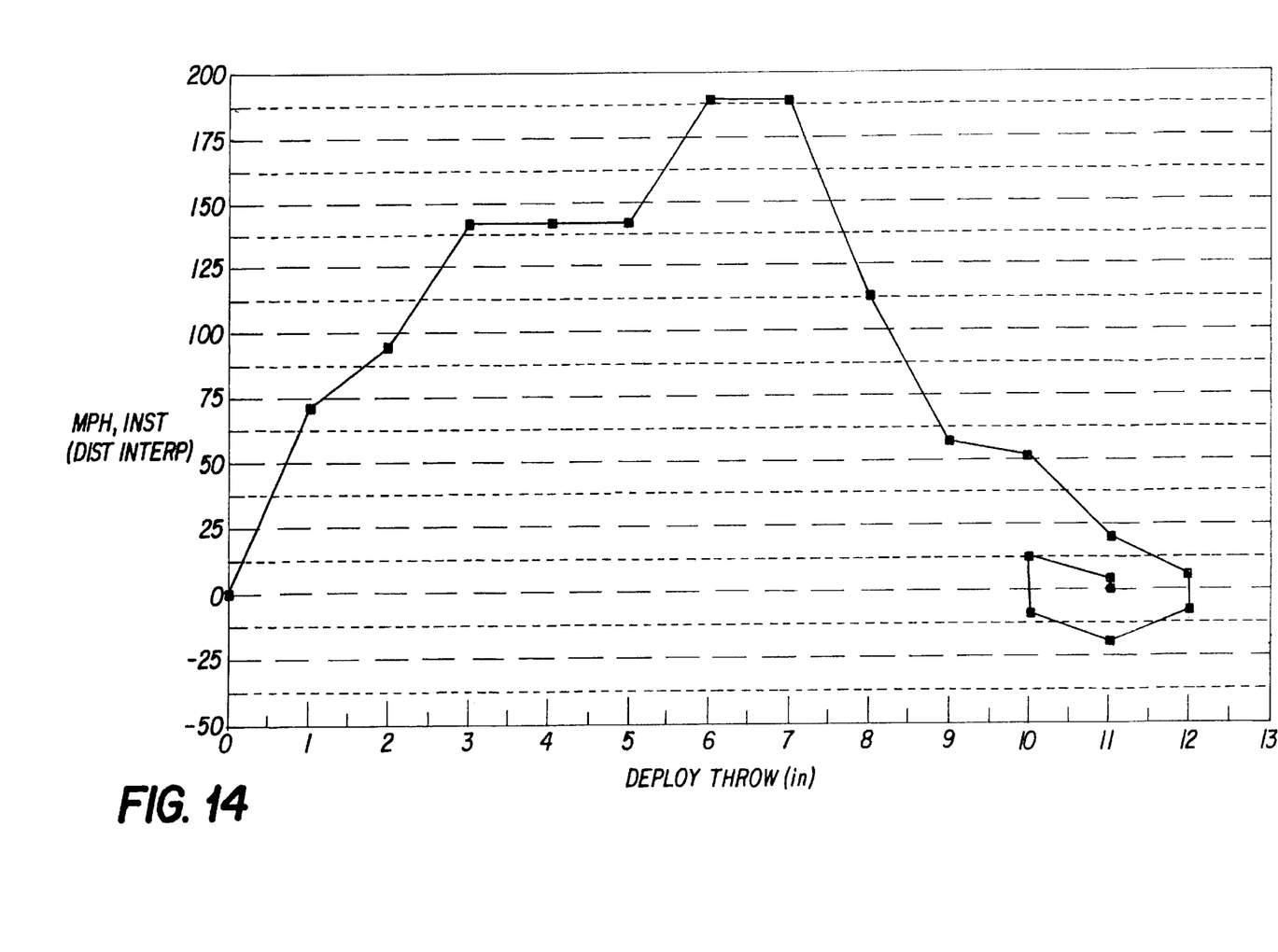
FIG. 14 is a drawing of the system output showing Envelope Velocity (MPH) vs Throw (in).

FIG. 14 shows the instantaneous velocity (MPH) versus instantaneous throw (inches), also derived from the full deployment data.

Although only a preferred embodiment is specifically illustrated and described herein, it will be readily appreciated that many modifications and variations of the present invention are possible in light of the above teachings and within the purview of the appended claims without departing from the spirit and intended scope of the invention.

What is claimed is:

1. A system for recording the inflation profile of a vehicle air bag, comprising:
    a checkerboard target in front of which said vehicle air bag is deployed, said checkerboard target including a plurality of light sensitive sensors spaced about said checkerboard target;
    an illuminating device spaced apart from said checkerboard target such that said vehicle air bag, when deployed, is deployed between said illuminating device and said checkerboard target;
    a deploy device connected to cause deployment of said vehicle air bag; and
    a computer, connected to both said deploy device and to said plurality of light sensitive sensors, for recording signals from said deploy device indicating that deployment of said vehicle air bag has been initiated and for receiving signals from said plurality of light sensitive sensors indicating the position of said vehicle air bag.

2. The system of claim 1, wherein said plurality of light sensitive sensors comprise photo-detecting devices and said system further includes converter means such that said vehicle air bag leading edge position is recorded in real-time during a live deployment.

3. The system of claim 1, further including a squib driver device connected for arming said vehicle air bag prior to deployment, and wherein squib deployment electrical parameters during a live air bag deployment are recorded by said computer.

4. The system of claim 1, further including a trigger and reset device connected for providing an adjustable firing impulse for said vehicle air bag and wherein said firing impulse may be calibrated prior to said vehicle air bag deployment and said firing impulse may be recorded during said vehicle air bag deployment.

5. The system of claim 2, wherein signals indicative of deployment progress of said vehicle air bag leading edge position are recorded as stepped output voltages, each related to a physical position, such that the operator of said system can monitor the deployment progress and boundaries immediately after said vehicle air bag is fired.

6. The system of claim 3, wherein said squib deployment electrical parameters are recorded with the same precision and resolution as the physical deployment of said vehicle air bag.

7. The system of claim 1, wherein said vehicle air bag under test whose inflation profile is being measured if one of an air bag mounted on the driver side, passenger side and side door of a vehicle.

8. The system of claim 1, wherein said plurality of light sensitive sensors are spaced about said checkerboard target in a predetermined pattern.

9. The system of claim 1, wherein said light sensitive sensors are arranged in three axes on said checkerboard target, control, left diagonal and right diagonal.

10. The system of claim 1, wherein said light sensitive sensors are placed at a plurality of checkerboard intersections.

11. A system for recording the inflation profile of a vehicle air bag, comprising:
    a target in front of which said vehicle air bag is deployed, said target including a plurality of light sensitive sensors spaced about said target;
    an illuminating device spaced apart from said target such that said vehicle air bag, when deployed, is deployed between said illuminating device and said target;
    a deploy device connected to cause deployment of said vehicle air bag; and
    a computer, connected to both said deploy device and to said plurality of light sensitive sensors, for recording signals from said deploy device indicating that deployment of said vehicle air bag has been initiated and for receiving signals from said plurality of light sensitive sensors indicating the position of said vehicle air bag.

12. A method for recording the inflation profile of a vehicle air bag, comprising the steps of:
    providing a checkerboard target in front of which said vehicle air bag is deployed, said checkerboard target including a plurality of light sensitive sensors spaced about said checkerboard target;
    illuminating said checkerboard target using an illuminating device spaced apart from said checkerboard target such that said vehicle air bag, when deployed, is deployed between said illuminating device and said checkerboard target;

deploying said vehicle air bag using a deploy device; and providing a computer, connected to both said deploy device and to said plurality of light sensitive sensors, for recording signals from said deploy device indicating that deployment of said vehicle air bag has been initiated and for receiving signals from said plurality of light sensitive sensors indicating the position of said vehicle air bag.

13. The method of claim 12, wherein said plurality of light sensitive sensors comprise photo-detecting devices and said system further includes converter means such that said vehicle air bag leading edge position is recorded in real-time during a live deployment.

14. The method of claim 12, further including a squib driver device connected for arming said vehicle air bag prior to deployment, and wherein squib deployment electrical parameters during a live air bag deployment are recorded by said computer.

15. The method of claim 12, further including a trigger and reset device connected for providing an adjustable firing impulse for said vehicle air bag and wherein said firing impulse may be calibrated prior to said vehicle air bag deployment and said firing impulse may be recorded during said vehicle air bag deployment.

16. The method of claim 13, wherein signals indicative of deployment progress of said vehicle air bag leading edge position are recorded as stepped output voltages, each related to a physical position, such that the operator of said system can monitor the deployment progress and boundaries immediately after said vehicle air bag is fired.

17. The method of claim 14, wherein said squib deployment electrical parameters are recorded with the same precision and resolution as the physical deployment of said vehicle air bag.

18. The method of claim 12, wherein said vehicle air bag under test whose inflation profile is being measured if one of an air bag mounted on the driver side, passenger side and side door of a vehicle.

19. The method of claim 12, wherein said plurality of light sensitive sensors are spaced about said checkerboard target in a predetermined pattern.

20. The method of claim 12, wherein said light sensitive sensors are arranged in three axes on said checkerboard target, control, left diagonal and right diagonal.

* * * * *